United States Patent
Wada et al.

(10) Patent No.: US 8,654,493 B2
(45) Date of Patent: Feb. 18, 2014

(54) PROTECTION CIRCUIT AND INPUT/OUTPUT CIRCUIT

(75) Inventors: Atsushi Wada, Ogaki (JP); Kouichi Yamada, Gifu-ken (JP); Shigeto Kobayashi, Gifu-ken (JP)

(73) Assignee: Semiconductor Components Industries, LLC, Phoenix, AZ (US)

( * ) Notice: Subject to any disclaimer, the term of this patent is extended or adjusted under 35 U.S.C. 154(b) by 22 days.

(21) Appl. No.: 13/436,439

(22) Filed: Mar. 30, 2012

(65) Prior Publication Data
US 2012/0250204 A1  Oct. 4, 2012

(30) Foreign Application Priority Data
Mar. 30, 2011 (JP) .................................. 2011-076297

(51) Int. Cl.
*H02H 3/20* (2006.01)
(52) U.S. Cl.
USPC .......................................................... 361/86
(58) Field of Classification Search
USPC .......................................................... 361/86
See application file for complete search history.

(56) References Cited

U.S. PATENT DOCUMENTS

| | | | | | |
|---|---|---|---|---|---|
| 4,618,857 | A | * | 10/1986 | Dubois et al. | 340/654 |
| 4,944,260 | A | * | 7/1990 | Shea et al. | 123/179.21 |
| 6,630,858 | B1 | * | 10/2003 | Takabayashi | 327/538 |
| 7,688,049 | B2 | * | 3/2010 | Iwabuchi et al. | 323/271 |
| 7,952,400 | B2 | * | 5/2011 | Abe | 327/142 |
| 2004/0246636 | A1 | * | 12/2004 | Inoue et al. | 361/18 |
| 2007/0285950 | A1 | * | 12/2007 | Nakamura et al. | 363/1 |

FOREIGN PATENT DOCUMENTS

JP          2010-205437          9/2010

* cited by examiner

*Primary Examiner* — Rexford Barnie
*Assistant Examiner* — Ann Hoang
(74) *Attorney, Agent, or Firm* — McDermott Will & Emery LLP

(57) ABSTRACT

A first voltage dividing circuit is connected between a power feeding line to feed power from an external power supply to an internal circuit, and a fixed potential to divide a voltage of the power feeding line. A first comparator compares a divided voltage, which has been divided by the first voltage dividing circuit, with a reference voltage, and outputs a signal to turn off a power switch inserted into the power feeding line when the divided voltage exceeds the reference voltage. A first transistor is connected between a first node where the divided voltage, which has been divided by the first voltage dividing circuit, is generated, and the fixed potential, and is turned on when the voltage of the first node exceeds a set voltage.

6 Claims, 5 Drawing Sheets

PROTECTION CIRCUIT AND INPUT/OUTPUT CIRCUIT

This application is based upon and claims the benefit of priority from the prior Japanese Patent Application No. 2011-076297, filed on Mar. 30, 2011, the entire content is incorporated herein by reference.

BACKGROUND OF THE INVENTION

1. Field of the Invention

The present invention relates to a protection circuit for protecting an internal circuit from a power supply fed from outside, and an input/output circuit with the protection circuit.

2. Description of the Related Art

In recent years, smartphones have rapidly become widespread. In many smartphones, an attempt to standardize a connector has been made in order to enhance a design and reduce a circuit size. For example, a model including only a Micro-USB connector is marketed. In this model, in addition to power feeding and data communication, exchange of an audio signal is performed with one Micro-USB connector. Such connector standardization has also been attempted in other portable devices such as a portable phone, a compact PC, a digital camera, a portable music player, an IC recorder, a game machine and the like.

The Micro-USB connector includes five terminals (pins) of a power supply terminal (VBUS), a ground terminal (GND), differential paired terminals (D+, D−), and an identification line terminal (ID). Various chargers are connected to the power supply terminal, to which a voltage exceeding a set breakdown voltage may be instantaneously applied. For example, since a commercial power supply is unstable in countries or regions having poor electricity situations, a voltage exceeding the set breakdown voltage may be applied from an AC-DC adaptor. Use of an element having a high breakdown voltage against the above-described contingency will lead to an increase in circuit size.

SUMMARY OF THE INVENTION

A protection circuit of an aspect of the present invention includes a first voltage dividing circuit that is connected between a power feeding line to feed power from an external power supply to an internal circuit, and a predetermined fixed potential to divide a voltage of the power feeding line, a first comparator that compares a divided voltage, which has been divided by the first voltage dividing circuit, with a reference voltage, and outputs a signal to turn off a power switch inserted into the power feeding line when the divided voltage exceeds the reference voltage, and a first protection switch that is connected between a first node where the divided voltage, which has been divided by the first voltage dividing circuit, is generated, and the fixed potential. The first protection switch is turned on when the voltage of the first node exceeds a first set voltage.

Another aspect of the present invention is an input/output circuit. This input/output circuit is an input/output circuit that connects a connector with at least a power supply terminal, and an internal circuit, including a power switch inserted into a power feeding line connecting the power supply terminal and the internal circuit, and a power supply detecting circuit that detects a voltage of the power feeding line between the power supply terminal and the power switch to turn on/off the power switch in accordance with a detection result. The power supply detecting circuit includes the above-described protection circuit.

Still another aspect of the present invention is also an input/output circuit. This input/output circuit is an input/output circuit that connects a connector with at least a power supply terminal, and an internal circuit, including a power switch inserted into a power feeding line connecting the power supply terminal and the internal circuit, a power supply detecting circuit that detects a voltage of the power feeding line between the power supply terminal and the power switch to turn on/off the power switch in accordance with a detection result, a first protection circuit that turns off the power switch to protect the internal circuit, when the voltage exceeding a first upper limit voltage is detected from the power feeding line, a regulator that receives the voltage fed from the power supply terminal to supply a constant voltage to the first protection circuit, and a second protection circuit that stops operation of the regulator, when a voltage exceeding a second upper limit voltage higher than the first upper limit voltage is detected from the power feeding line.

DETAILED DESCRIPTION OF THE INVENTION

The invention will now be described by reference to the preferred embodiments. This does not intend to limit the scope of the present invention, but to exemplify the invention.

Figure 1:
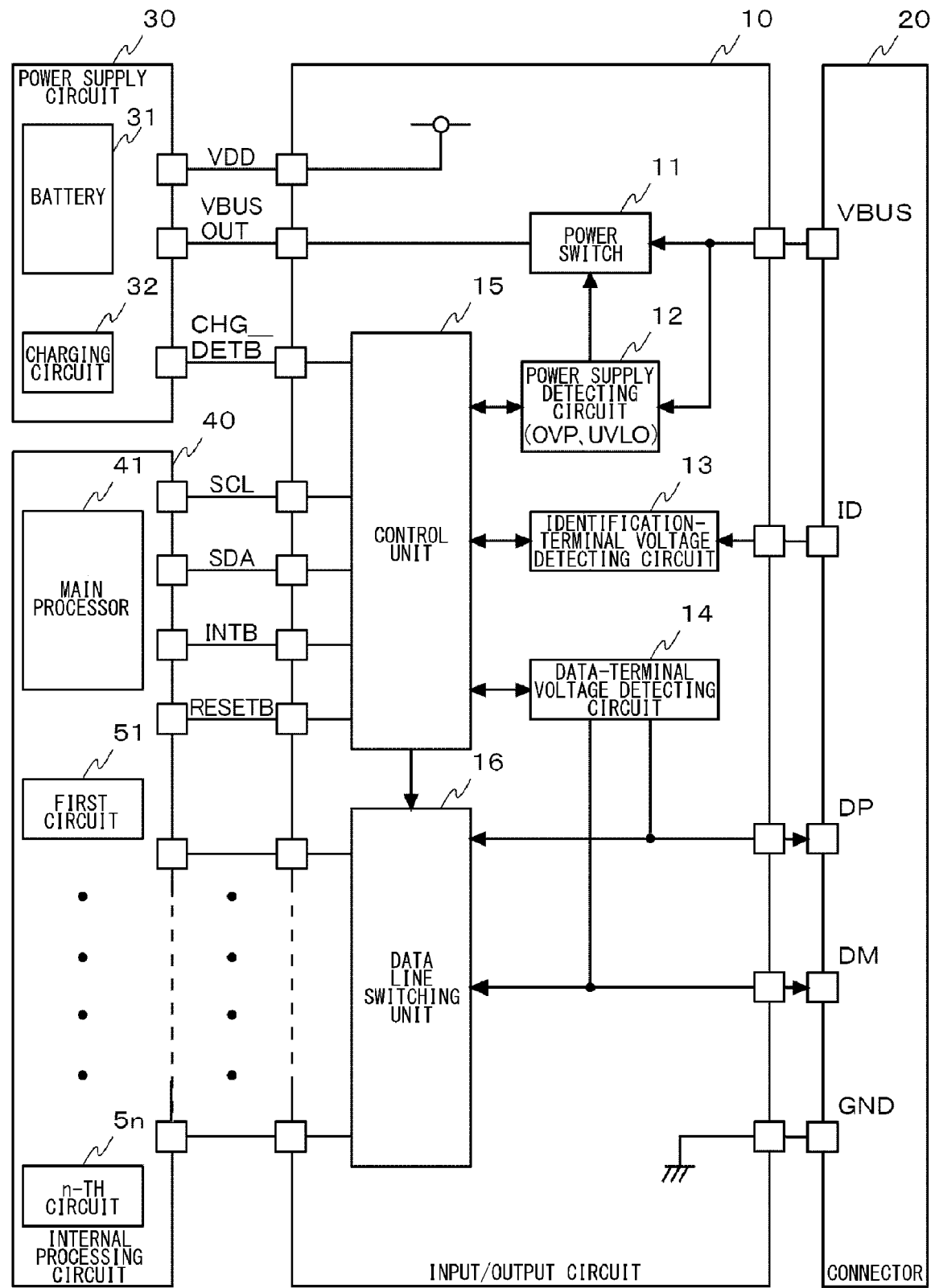
FIG. 1 is a diagram for describing a configuration of an input/output circuit according to an embodiment of the present invention.

FIG. 1 is a diagram for describing a configuration of an input/output circuit 10 according to an embodiment of the present invention. The input/output circuit 10 connects a connector 20 to a power supply circuit 30 and an internal processing circuit 40, which are an internal circuit. Hereinafter, in the present specification, an example in which the input/output circuit 10, the connector 20, the power supply circuit 30 and the internal processing circuit 40 are mounted on a smartphone will be described. Moreover, an example in which as the connector 20, a Micro-USB connector is employed will be described. The Micro-USB connector includes five terminals (pins) of a power supply terminal (VBUS), a ground terminal (GND), differential paired terminals (D+, D−), and an identification line terminal (ID).

The power supply circuit 30 includes a battery 31 and a charging circuit 32. As the battery 31, a lithium-ion battery or a nickel hydride battery is employed. When a charger is connected to the connector 20, power is charged to the battery 31 from the charger through a power supply path inside the input/output circuit 10 under control by the charging circuit 32.

The internal processing circuit 40 includes a main processor 41, a first circuit 51, ... an n-th circuit 5n. The main processor 41 controls an overall terminal device mounted (in the present embodiment, a smartphone). The first circuit 51, ... the n-th circuit 5n are circuits that execute respective dedicated types of processing. For example, an image processing circuit, a audio processing circuit, a PHY (Physical Layer Chip) circuit, a UART (Universal Asynchronous Receiver Transmitter) circuit and the like correspond to the foregoing circuits. The main processor 41, the first circuit 51, ... the n-th circuit 5n exchange signals with a device (e.g., a PC) or an accessory device (e.g., an earphone, a headphone, a microphone) that is connected to the connector 20 through the input/output circuit 10.

The input/output circuit 10 includes a power switch 11, a power supply detecting circuit 12, an identification-terminal voltage detecting circuit 13, a data-terminal voltage detecting circuit 14, a control unit 15, and a data line switch unit 16. Power of the input/output circuit 10 is basically supplied from the battery 31 through a VDD terminal. Power of the power supply detecting circuit 12 is supplied from the charger connected to the connector 20 through the VBUS terminal. In the present embodiment, a configuration of a VBUS system including the power switch 11 and the power supply detecting circuit 12 is designed so as to have 28-V breakdown voltage.

The power switch 11 is inserted into a power feeding line connecting the VBUS terminal and the internal circuit to switch whether to conduct the power supplied from the charger connected to the connector 20 through the VBUS terminal to the battery 31 through a VBUS OUT terminal or to cut off the same. As the power switch 11, a power MOSFET or the like can be employed. The switching of the power switch 11 is controlled by the power supply detecting circuit 12.

The power supply detecting circuit 12 detects a voltage of the power feeding line between the VBUS terminal and the power switch 11 to turn on/off the power switch 11 in accordance with a detection result. More specifically, upon detecting the power feeding from outside to the VBUS terminal, the power supply detecting circuit 12 turns on the power switch 11, and notifies the control unit 15 of the power supply detection. The design may be such that after receiving a permission signal to turn on the power switch 11 from the control unit 15, the power switch 11 is turned on.

The power supply detecting circuit 12 includes an undervoltage lockout circuit UVLO and an overvoltage protection circuit OVP. The undervoltage lockout circuit UVLO and the overvoltage protection circuit OVP will be described in detail later.

The identification-terminal voltage detecting circuit 13 detects a voltage of the ID terminal to notify the control unit 15. For example, the identification-terminal voltage detecting circuit 13 can be made of an analog/digital converter. Many of accessory devices each utilize a resistance value between an ID terminal and a GND terminal thereof as its own identification information. Accordingly, detecting the voltage of the ID terminal of the connector 20 allows a type of the accessory device connected to the connector 20 to be almost specified.

The data-terminal voltage detecting circuit 14 monitors and detects voltages of the DP terminal and the DM terminal. More specifically, the data-terminal voltage detecting circuit 14 detects opening, pullup or pulldown of at least one of the DP terminal and the DM terminal, or short between both the terminals. Also, a type of the pullup/pulldown (a difference in the pullup/pulldown resistor) can be detected. The data-terminal voltage detecting circuit 14 notifies the control unit 15 of a detection result.

The control unit 15 controls the overall input/output circuit 10. In the present embodiment, an example in which an $I^2C$ serial controller is employed as the control unit 15 will be described. In this case, the control unit 15 receives a clock signal from the internal processing circuit 40 through an $I^2C\_SCL$ terminal. Moreover, between the control unit 15 and the internal processing circuit 40, data signals are exchanged through an $I^2C\_SDA$ terminal. Moreover, the control unit 15 supplies an interrupt signal to the internal processing circuit 40 through an INTB terminal. Furthermore, the control unit 15 receives a hardware reset signal from the internal processing circuit 40 through a RESETB terminal.

The control unit 15 supplies a charger detection signal through a CHG_DETB terminal to the charging circuit 32. Moreover, the control unit 15 can supply control signals to each of the power supply detecting circuit 12, the identification-terminal voltage detecting circuit 13 and the data-terminal voltage detecting circuit 14.

The data line switch unit 16 includes a plurality of switches to perform switching control of various signals exchanged between the internal processing circuit 40 and external devices through the DP terminal and the DM terminal. In the present specification, since the switching of the data line switch unit 16 is not paid attention, a detailed description of an internal configuration thereof will be omitted.

Figure 2:
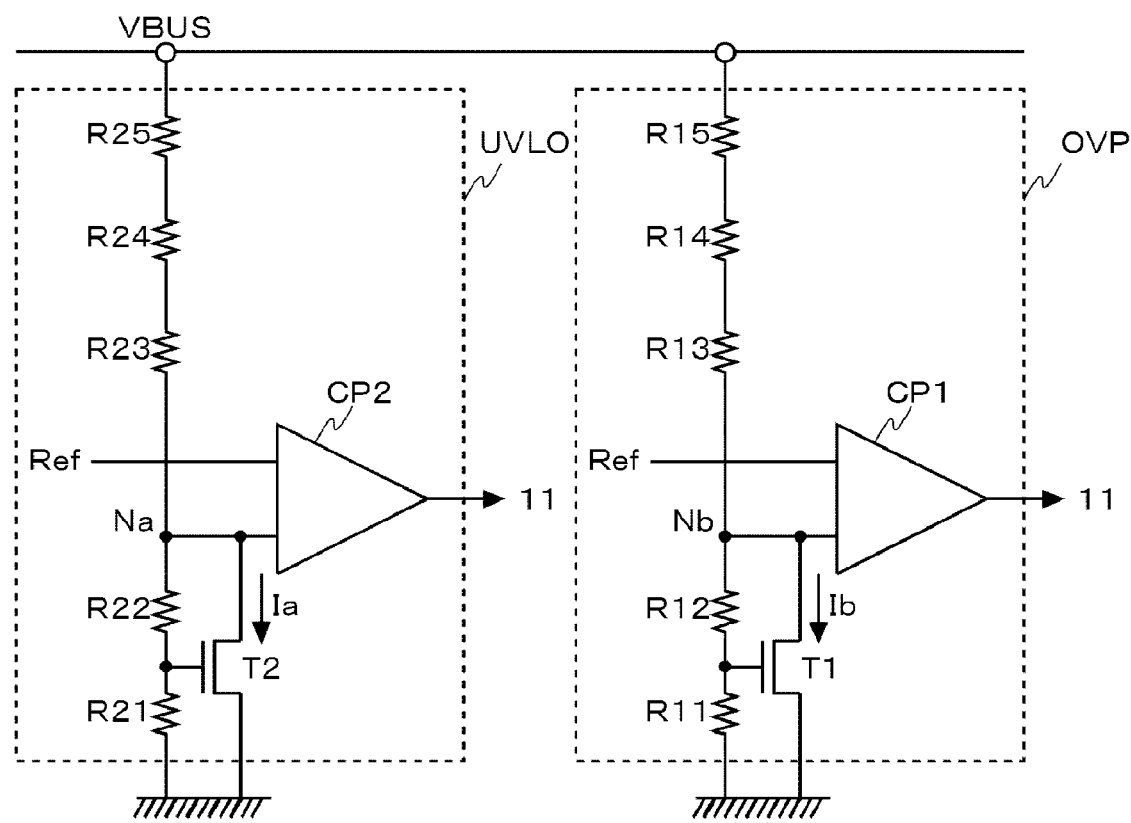
FIG. 2 is a diagram showing a configuration example of an undervoltage lockout circuit and an overvoltage protection circuit.

FIG. 2 is a diagram showing a configuration example of the undervoltage lockout circuit UVLO and the overvoltage protection circuit OVP. The undervoltage lockout circuit UVLO and the overvoltage protection circuit OVP are circuits to limit the voltage fed to the internal circuit through the power feeding line to a certain range. In the present embodiment, the range is set to 4 V to 6 V.

The undervoltage lockout circuit UVLO is a circuit to detect whether the voltage is below a lower limit voltage of the range (in the present embodiment, 4 V), and when the voltage is below the lower limit voltage, the power switch 11 is turned off. The overvoltage protection circuit OVP is a circuit to detect whether the voltage exceeds an upper limit voltage of the range (in the present embodiment, 6 V), and when the voltage exceeds the upper limit voltage, the power switch 11 is turned off.

The overvoltage protection circuit OVP includes a first voltage dividing circuit, a first comparator CP1 and a first transistor T1. The first voltage dividing circuit is connected between the above-described power feeding line and a predetermined fixed potential to divide the voltage of the power feeding line. In the present embodiment, the fixed potential is a ground potential. When a configuration in FIG. 5 described later is employed, for a power supply of a comparator CP2 (CP1), a voltage from the power feeding line through a regulator is supplied.

The first voltage dividing circuit is configured by connecting a 1.1-th resistor R11, a 1.2 resistor R12, a 1.3-th resistor R13, a 1.4-th resistor R14, and a 1.5-th resistor R15 in series. A voltage of a first node Nb between the 1.2-th resistor R12 and the 1.3-th resistor R13 is an input voltage of the first comparator CP1.

In the present embodiment, a ratio between a combined resistor of the 1.1-th resistor R11 and the 1.2-th resistor R12, and a combined resistor of the 1.3-th resistor R13, the 1.4-th resistor R14 and the 1.5-th resistor R15 is set to 1:4. That is, when the voltage of the power feeding line is 6V, the voltage of the first node Nb is 1.2 V.

The first comparator CP1 compares the divided voltage, which has been divided by the first voltage dividing circuit (in the present embodiment, the voltage of the first node Nb), with a reference voltage Ref, and when the divided voltage exceeds the reference voltage Ref in a high potential direction, the first comparator CP1 outputs a signal to turn off the power switch 11. The reference voltage Ref is generated by a bandgap reference circuit 12c described later (refer to FIG. 5), and is set to 1.2 V in the present embodiment.

The first transistor T1 is connected between the first node Nb and a ground. More specifically, a source terminal of the first transistor T1 is connected to the ground, a gate terminal thereof is connected to a node between the 1.1-th resistor R11 and the 1.2-th resistor R12, and a drain terminal thereof is connected to the first node Nb.

The first transistor T1 is turned on when a node voltage between the 1.1-th resistor R11 and the 1.2-th resistor R12 exceeds a threshold of the first transistor T1. When the first transistor T1 is turned on, a current Ib is drawn out from the first node Nb to the ground to suppress a rise of the voltage of the first node Nb. That is, the first transistor T1 functions as a protection switch that is turned on when the voltage of the first node Nb exceeds a first set voltage. Providing the protection switch can decrease a breakdown voltage of the first comparator CP1, and can reduce a circuit size and power consumption of the first comparator CP1. When the first transistor T1 is not provided, in the present embodiment, the first comparator CP1 needs to be designed so as to have a breakdown voltage corresponding to the above-described 28-V breakdown voltage.

The undervoltage lockout circuit UVLO includes a second voltage dividing circuit, the second comparator CP2 and a second transistor T2. The second voltage dividing circuit is connected between the above-described power feeding line and a ground to divide the voltage of the power feeding line. When the configuration in FIG. 5 described later is employed, for the power supply of the comparator CP2 (CP1), the voltage from the power feeding line through the regulator is supplied. The second voltage dividing circuit is configured by connecting a 2.1-th resistor R21, a 2.2-th resistor R22, a 2.3-th resistor R23, a 2.4-th resistor R24, and a 2.5-th resistor R25 in series. A voltage of a second node Na between the 2.2-th resistor R22 and the 2.3-th resistor R23 is an input voltage of the second comparator CP2.

In the present embodiment, a ratio between a combined resistance of the 2.1-th resistor R21 and the 2.2-th resistor R22, and a combined resistance of the 2.3-th resistor R23, the 2.4-th resistor R24 and the 2.5-th resistor R25 is set to 3:7. That is, the voltage of the second node Na is 1.2 V when the voltage of the power feeding line is 4 V.

The second comparator CP2 compares the divided voltage, which has been divided by the second voltage dividing circuit (in the present embodiment, the voltage of the second node Na), with the reference voltage Ref, and when the divided voltage exceeds the reference voltage Ref on a low potential side, the second comparator CP2 outputs a signal to turn off the power switch 11. The reference voltage Ref is generated by the bandgap reference circuit 12c described later (refer to FIG. 5), and is set to 1.2 V in the present embodiment.

The second transistor T2 is connected between the second node Na and the ground. More specifically, a source terminal of the second transistor T2 is connected to the ground, a gate terminal thereof is connected to a node between the 2.1-th resistor R21 and the 2.2-th resistor R22, and a drain terminal thereof is connected to the second node Na.

The second transistor T2 is turned on when a node voltage between the 2.1-th resistor R21 and the 2.2-th resistor R22 exceeds a threshold of the second transistor T2. When the second transistor T2 is turned on, a current Ia is drawn out from the second node Na to the ground to suppress a rise of the voltage of the second node Na. That is, the second transistor T2 functions as a protection switch that is turned on when the voltage of the second node Na exceeds a second set voltage. Providing the protection switch can decrease a breakdown voltage of the second comparator CP2, and can reduce a circuit size and power consumption of the second comparator CP2. When the second transistor T2 is not provided, in the present embodiment, the second comparator CP2 needs to be designed so as to have a breakdown voltage corresponding to the above-described 28-V breakdown voltage.

Figure 3:
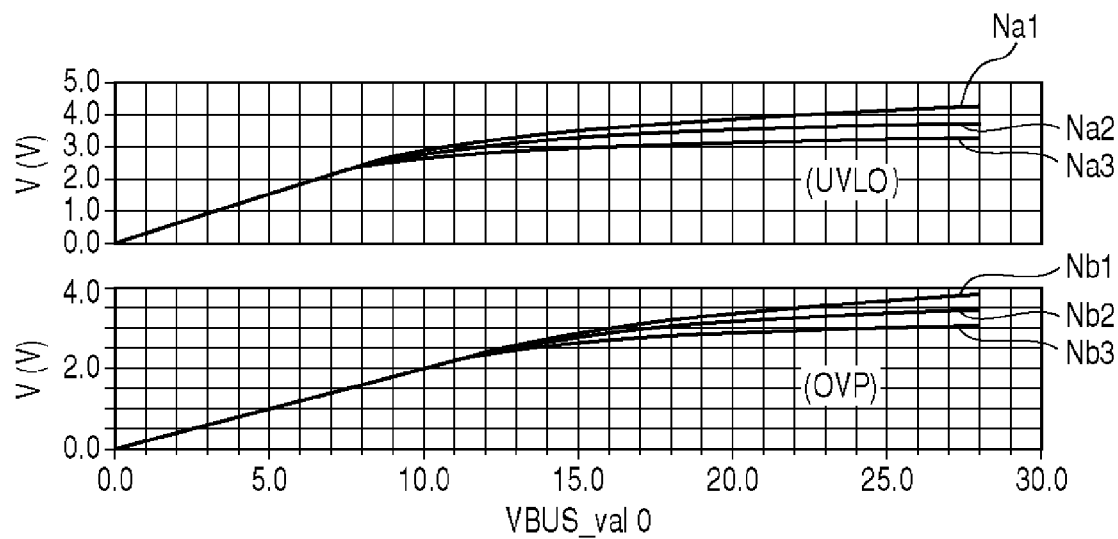
FIG. 3 is a diagram showing characteristics of a second node voltage of the undervoltage lockout circuit, and a first node voltage of the overvoltage protection circuit.

FIG. 3 is a diagram showing characteristics of the voltage of the second node Na in the undervoltage lockout circuit UVLO, and the voltage of the first node Nb in the overvoltage protection circuit OVP. Voltage characteristics Na1 indicate voltage characteristics of the second node Na at 125° C., voltage characteristics Na2 indicate voltage characteristics of the second node Na at 25° C., and voltage characteristics Na3 indicate voltage characteristics of the second node Na at −40° C. In any case, it can be seen that the voltage of the second node Na rises linearly till the voltage fed from the VBUS terminal reaches about 8 V, and when the voltage exceeds 8 V, the rise of the voltage of the second node Na can be suppressed.

Voltage characteristics Nb1 indicate voltage characteristics of the first node Nb at 125° C., voltage characteristics Nb2 indicate voltage characteristics of the first node Nb at 25° C., and voltage characteristics Nb3 indicate voltage characteristics of the first node Nb at −40° C. In any case, it can be seen that the voltage of the first node Nb rises linearly till the voltage fed from the VBUS terminal reaches about 12 V, and when the voltage exceeds 12 V, the rise of the voltage of the first node Nb can be suppressed.

Moreover, it can be seen that even when the voltage fed from the VBUS terminal is 28 V, both of the voltage of the second node Na in the undervoltage lockout circuit UVLO and the voltage of the first node Nb in the overvoltage protection circuit OVP are less than 5V. Accordingly, it is sufficient to design the first comparator CP1 and the second comparator CP2 so as to have a 5-V breakdown voltage. The comparator made of a transistor having the 5-V breakdown voltage will have sensing accuracy higher than a comparator made of a transistor having a breakdown voltage higher than the 5-V breakdown voltage. Moreover, the comparator can be designed so as to save an area.

Figure 4:
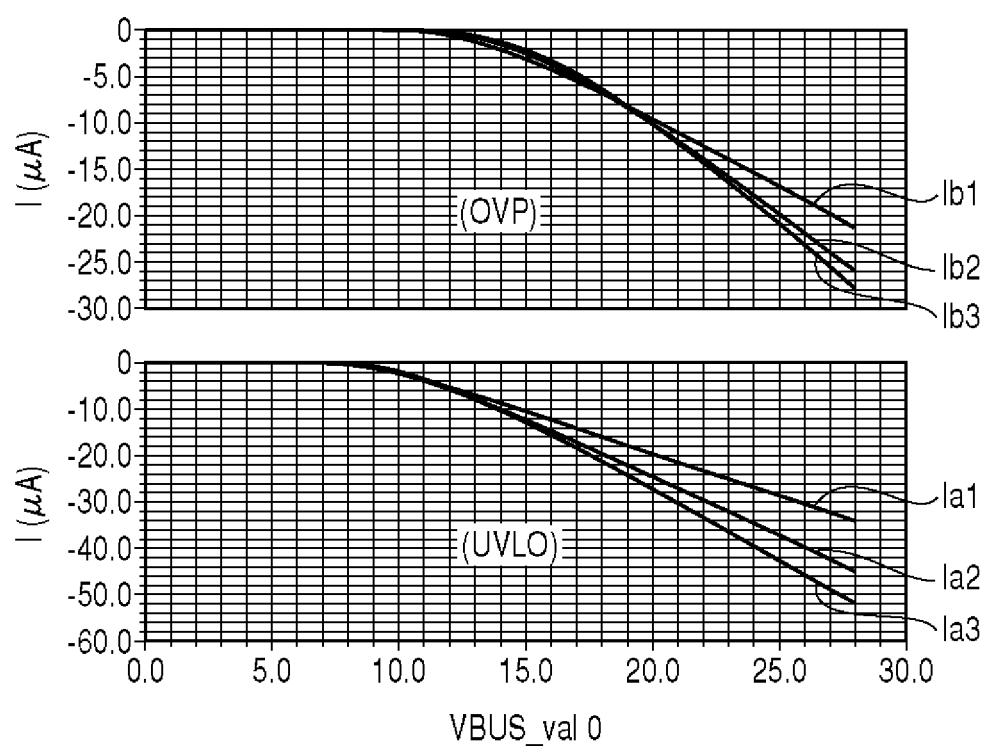
FIG. 4 is a diagram showing characteristics of a current flowing in a second transistor of the undervoltage lockout circuit and a current flowing in a first transistor of the overvoltage protection circuit.

FIG. 4 is a diagram showing characteristics of the current Ia flowing in the second transistor T2 of the undervoltage lockout circuit UVLO and the current Ib flowing in the first transistor T1 of the overvoltage protection circuit OVP. Current characteristics Ib1 indicate characteristics of the current flowing in the first transistor T1 at 125° C., current characteristics Ib2 indicate characteristics of the current flowing in the first transistor T1 at 25° C., and current characteristics Ib3 indicate characteristics of the current flowing in the first transistor T1 at −40° C. In any case, the current does not flow in the first transistor T1 till the voltage fed from the VBUS terminal reaches about 12 V, and when the voltage exceeds 12 V, the current begins to flow to thereby suppress the rise of the voltage of the first node Nb.

Current characteristics Ia1 indicate characteristics of the current flowing in the second transistor T2 at 125° C., current characteristics Ia2 indicate characteristics of the current flowing in the second transistor T2 at 25° C., and current characteristics Ia3 indicate characteristics of the current flowing in the second transistor T2 at −40° C. In any case, the current does not flow in the second transistor T2 till the voltage fed from the VBUS terminal reaches about 8 V, and when the voltage exceeds 8 V, the current begins to flow to thereby suppress the rise of the voltage of the second node Na.

It can be seen that when the voltage fed from the VBUS terminal is less than 6 V, the current flows neither in the first transistor T1 nor in the second transistor T2, and voltage sensing operation by either of the first comparator CP1 and the second comparator CP2 is not affected.

Figure 5:
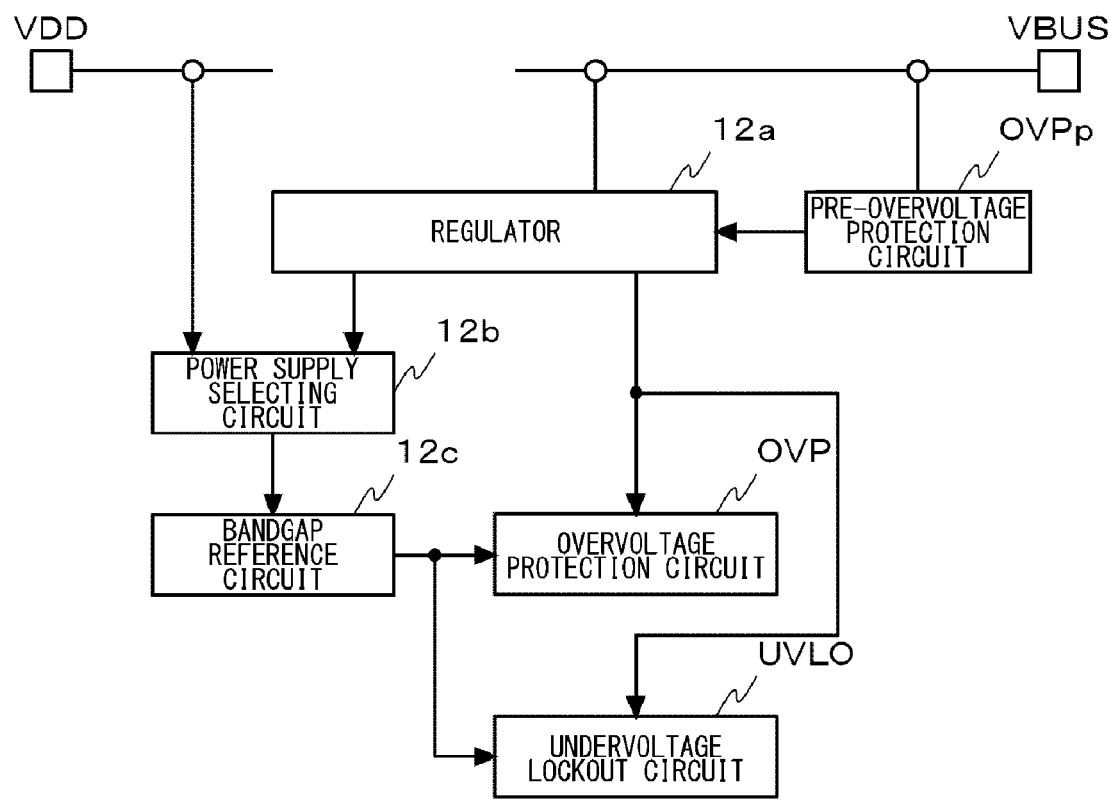
FIG. 5 is a diagram showing a configuration example of a power supply detecting circuit.

FIG. 5 is a diagram showing a configuration example of the power supply detecting circuit 12. In the configuration example, the power supply detecting circuit 12 includes a regulator 12a, a power supply selecting circuit 12b, the bandgap reference circuit 12c, the overvoltage protection circuit OVP, the undervoltage lockout circuit UVLO, and a pre-overvoltage protection circuit OVPp.

The regulator 12a receives the voltage fed from the VBUS terminal, and supplies a constant voltage to the power supply selecting circuit 12b, the overvoltage protection circuit OVP and the undervoltage lockout circuit UVLO. As the regulator 12a, for example, a general low-loss regulator can be employed.

The power supply selecting circuit 12b selects any one of the internal power from the internal circuit (more strictly, the power supply circuit 30), and the external power from the regulator 12a so that the selected power is supplied to the bandgap reference circuit 12c. The power supply selected by the power supply selecting circuit 12b is utilized not only as the power supply for the bandgap reference circuit 12c, but also as another control voltage to control the VBUS system not shown.

When a capacity of the battery 31 inside the power supply circuit 30 is zero, and the power feeding from the internal circuit is disabled or the like, the power supply selecting circuit 12b selects the external power supply from the regulator 12a. On the other hand, when the charger is not connected to the connector 20, the power supply selecting circuit 12b selects the internal power supply from the internal circuit. When the power feeding from the internal circuit is enabled, and the charger is also connected to the connector 20, the power supply selecting circuit 12b may select the internal power supply or may select the external power supply.

The bandgap reference circuit 12c generates the reference voltages Ref of the overvoltage protection circuit OVP and the undervoltage lockout circuit UVLO, based on the voltage supplied from the power supply selecting circuit 12b.

The pre-overvoltage protection circuit OVPp is a circuit to detect the voltage fed to the internal circuit through the power feeding line. The pre-overvoltage protection circuit OVPp determines whether the voltage exceeds an upper limit voltage (in the present embodiment, 12 V). The overvoltage protection circuit OVP determines whether the voltage exceeds an upper limit voltage (in the present embodiment, 6V). The former upper limit voltage is set to be higher than the latter upper limit voltage.

A circuit configuration of the pre-overvoltage protection circuit OVPp is basically similar to the circuit configuration of the overvoltage protection circuit OVP shown in FIG. 2. Hereinafter, different points will be described. In the pre-overvoltage protection circuit OVPp, when the first node voltage Nb exceeds the reference voltage Ref on the high potential side, the first comparator CP1 outputs a signal to stop operation of the regulator 12a in place of the signal to turn off the power switch 11. While the first transistor T1 may be provided or may not be provided, it has already been described that the provision can lower the breakdown voltage of the first comparator CP1, which contributes to the reduction in circuit size and power consumption. Moreover, since the pre-overvoltage protection circuit OVPp only protects the regulator, high-accuracy determination is not necessarily required, as compared with the overvoltage protection circuit OVP. Accordingly, accuracy can be decreased, depending on the breakdown voltage of the regulator, and in this case, the comparator can also be simplified.

According to the present configuration example, since the design is such that when the voltage of the above-described power feeding line exceeds 12 V, the regulator 12a stops, the breakdown voltage of the regulator 12a can be decreased to lower than 28 V (in the present embodiment, 12-V breakdown voltage). Accordingly, a circuit size and power consumption of the regulator 12a can be reduced.

In the present configuration example, while when the voltage of the above-described power feeding line exceeds 12 V, the regulator 12a stops, and thus the overvoltage protection circuit OVP and the undervoltage lockout circuit UVLO also stop, when the voltage of the power feeding line becomes 12 V or lower, the regulator 12a returns, and the overvoltage protection circuit OVP and the undervoltage lockout circuit UVLO also return.

As described above, according to the present embodiment, the provision of the first transistor T1 in the overvoltage protection circuit OVP allows the internal circuit to be protected from an irregularly high voltage applied to the power feeding line while suppressing an increase in circuit size. Since the increase in circuit size is suppressed, lower cost and lower power consumption are achieved. Moreover, the provision of the undervoltage lockout circuit UVLO with the similar configuration allows the sensing circuit itself to be protected even if the irregularly high voltage is input, allows the voltage within the certain range to be supplied to the internal circuit, and can make the design of the internal circuit simple. Moreover, the provision of the pre-overvoltage protection circuit OVPp allows the two-staged overvoltage protection to be performed, and the circuit size of the regulator 12a to be reduced.

In the foregoing, the present invention has been described based on the embodiment. It will be understood by those in the art that this embodiment is illustrative, that various modifications can be made in combination of the respective components and the respective processing processes, and that such modifications are within the scope of the present invention.

For example, the overvoltage protection circuit OVP shown in FIG. 2 can be applied to overvoltage protection of communication standards enabling power feeding other than Micro-USB standard, and overvoltage protection of a power feeding circuit not involving data communication as well. Moreover, the circuit configurations of the overvoltage protection circuit OVP and the pre-overvoltage protection circuit OVPp shown in FIG. 5 are not limited to the circuit configuration shown in FIG. 2.

What is claimed is:
1. A protection circuit, comprising:
a first voltage dividing circuit that is connected between a power feeding line to feed power from an external power supply to an internal circuit, and a predetermined fixed potential to divide a voltage of the power feeding line;
a first comparator that compares a divided voltage, which has been divided by the first voltage dividing circuit, with a reference voltage, and outputs a signal to turn off a power switch inserted into the power feeding line when the divided voltage exceeds the reference voltage; and
a first transistor having a drain terminal connected to a first node where the divided voltage, which has been divided by the first voltage dividing circuit, is generated, having a source terminal connected to the fixed potential, and having a gate terminal connected to a voltage division node between the first node and the fixed potential, wherein the first transistor is turned on when the voltage of the first node exceeds a first set voltage.

2. The protection circuit according to claim 1, further comprising:
   a second voltage dividing circuit that is connected between the power feeding line and the fixed potential to divide the voltage of the power feeding line;
   a second comparator that compares a divided voltage, which has been divided by the second voltage dividing circuit, with a reference voltage, and outputs a signal to turn off the power switch when the divided voltage exceeds the reference voltage; and
   a second transistor having a drain terminal connected to a second node where the divided voltage, which has been divided by the second voltage dividing circuit, is generated, having a source terminal connected to the fixed potential, and having a gate terminal connected to a voltage division node between the second node and the fixed potential, wherein
   the second transistor is turned on when the voltage of the second node exceeds a second set voltage,
   the first voltage dividing circuit, the first comparator and the first transistor are circuits for detecting whether the voltage of the power feeding line exceeds an upper limit voltage, and
   the second voltage dividing circuit, the second comparator and the second transistor are circuits for detecting whether the voltage of the power feeding line exceeds a lower limit voltage.

3. An input/output circuit that connects a connector with at least a power supply terminal, and an internal circuit, comprising:
   a power switch inserted into a power feeding line connecting the power supply terminal and the internal circuit; and
   a power supply detecting circuit that detects a voltage of the power feeding line between the power supply terminal and the power switch to turn on/off the power switch in accordance with a detection result, wherein
   the power supply detecting circuit includes the protection circuit according to claim 1.

4. The input/output circuit according to claim 3, further comprising a regulator that receives the voltage fed from the power supply terminal to supply a constant voltage to the protection circuit according to claim 1, wherein
   when the power feeding from a power supply inside the internal circuit to a reference voltage supply that generates the reference voltage is disabled, the regulator supplies the constant voltage to the reference voltage supply.

5. The input/output circuit according to claim 4, further comprising:
   a second voltage dividing circuit that is connected between the power feeding line between the power supply terminal and the power switch, and the fixed potential to divide the voltage of the power feeding line; and
   a second comparator that compares a divided voltage, which has been divided by the second voltage dividing circuit, with a reference voltage, and outputs a signal to stop operation of the regulator when the divided voltage exceeds the reference voltage, wherein
   the protection circuit including the second voltage dividing circuit and the second comparator determines whether a divided voltage which has been divided by the second voltage dividing circuit exceeds an upper limit voltage, and the protection circuit including the first voltage dividing circuit, the first comparator, and the first protection switch determines whether a voltage of the first node exceeds an upper limit voltage, the former upper limit voltage being set to be higher than the latter upper limit voltage.

6. The input/output circuit according to claim 4, further comprising:
   a second voltage dividing circuit that is connected between the power feeding line between the power supply terminal and the power switch, and the fixed potential to divide the voltage of the power feeding line;
   a second comparator that compares a divided voltage, which has been divided by the second voltage dividing circuit, with a reference voltage, and outputs a signal to stop operation of the regulator when the divided voltage exceeds the reference voltage; and
   a second transistor having a drain terminal connected to a second node where the divided voltage, which has been divided by the second voltage dividing circuit, is generated, having a source terminal connected to the fixed potential, and having a gate terminal connected to a voltage division node between the second node and the fixed potential; wherein
   the second transistor is turned on when the voltage of the second node exceeds a second set voltage, and
   the protection circuit including the second voltage dividing circuit, the second comparator, and the second transistor determines whether a voltage of the second node exceeds an upper limit voltage, and the protection circuit including the first voltage dividing circuit, the first comparator, and the first transistor determines whether a voltage of the first node exceeds an upper limit voltage, the former upper limit voltage being set to be higher than the latter upper limit voltage.

* * * * *